United States Patent
Nowling

(10) Patent No.: US 12,013,081 B2
(45) Date of Patent: Jun. 18, 2024

(54) INDICATOR CONNECTION ADAPTER DEVICE

(71) Applicant: Michael Nowling, Cedar, MN (US)

(72) Inventor: Michael Nowling, Cedar, MN (US)

( * ) Notice: Subject to any disclaimer, the term of this patent is extended or adjusted under 35 U.S.C. 154(b) by 0 days.

(21) Appl. No.: 18/199,424

(22) Filed: May 19, 2023

(65) Prior Publication Data
US 2023/0375129 A1  Nov. 23, 2023

Related U.S. Application Data

(60) Provisional application No. 63/473,336, filed on May 23, 2022.

(51) Int. Cl.
*F16M 13/02* (2006.01)

(52) U.S. Cl.
CPC .................... *F16M 13/022* (2013.01)

(58) Field of Classification Search
CPC .. B23B 27/00; B23B 2231/04; F16M 13/022; Y10T 279/3406; Y10T 279/3412; Y10T 279/3418
USPC ............. 279/2.01, 2.02, 2.03, 2.04; 211/13.1
See application file for complete search history.

(56) References Cited

U.S. PATENT DOCUMENTS

| | | | | |
|---|---|---|---|---|
| 3,819,193 A * | 6/1974 | Kyriakou | ............ | B23B 31/4006 279/2.03 |
| 4,768,791 A * | 9/1988 | Whiting | ............ | B23B 31/4093 279/2.12 |
| 5,226,762 A * | 7/1993 | Ecker | ............ | B23B 51/0473 408/209 |
| 5,366,312 A * | 11/1994 | Raines | ............ | B27B 5/32 30/340 |
| 5,833,169 A * | 11/1998 | Morand | ............ | A47K 10/38 242/596.4 |
| 7,331,585 B2 * | 2/2008 | Lindstrom | ............ | B23B 31/208 279/156 |
| 7,488,146 B2 * | 2/2009 | Brunson | ............ | B23B 31/008 408/239 R |
| 7,506,877 B1 * | 3/2009 | Henderson | ............ | B23B 31/1078 279/143 |
| 7,958,619 B1 * | 6/2011 | Pletschet | ............ | B23B 31/402 279/2.03 |
| 9,687,917 B2 * | 6/2017 | Pamatmat | ............ | B23B 51/0473 |
| D843,546 S * | 3/2019 | Fagin | ............ | D22/147 |
| 10,286,466 B2 * | 5/2019 | Zhang | ............ | B27B 5/32 |
| 10,965,078 B2 * | 3/2021 | Solanki | ............ | H01R 4/183 |
| 2008/0029978 A1 * | 2/2008 | Evans | ............ | B23B 31/16 279/110 |
| 2011/0291368 A1 * | 12/2011 | Chen | ............ | B24B 45/00 279/143 |

(Continued)

*Primary Examiner* — Joshua E Rodden

(57) ABSTRACT

An indicator connection adapter device includes a body having a first face, a second face, and a peripheral wall. A primary hole and an offset hole each extend through the body perpendicular to the first face and the second face. The primary hole is centrally positioned on the body. The offset hole is diametrically smaller than the primary hole. The offset hole abuts the primary hole. A set screw is extendable through a set screw aperture for selectively securing an extension of an indicator in the primary hole or a connector of an indicator in the offset hole. Flanges are coupled to and extend outwardly from the second face. The flanges are radially arranged around the primary hole for engaging the body to a collet of a computer numerical control machine.

12 Claims, 7 Drawing Sheets

(56) References Cited

U.S. PATENT DOCUMENTS

| | | | |
|---|---|---|---|
| 2011/0316242 A1* | 12/2011 | Zhang | B27B 5/30 |
| | | | 279/143 |
| 2015/0014908 A1* | 1/2015 | Chen | B23C 3/14 |
| | | | 279/2.03 |
| 2015/0165534 A1* | 6/2015 | Hamm | B23G 1/52 |
| | | | 408/124 |
| 2016/0052064 A1* | 2/2016 | Matlik | B23B 31/265 |
| | | | 279/2.02 |
| 2019/0299299 A1* | 10/2019 | Motschi | B23B 31/4033 |
| 2021/0025700 A1* | 1/2021 | Kram | G01B 5/255 |

* cited by examiner

INDICATOR CONNECTION ADAPTER DEVICE

CROSS-REFERENCE TO RELATED APPLICATIONS

I hereby claim the benefit under 35 U.S.C. Section 119(e) of U.S. Provisional application 63/473,336 filed May 23, 2022.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to indicator devices used for consistency measurement in computer numerical control machining and more particularly pertains to a new indicator connection adapter for facilitating indicator adjustment.

(2) Description of Related Art Including Information Disclosed Under 37 CFR 1.97 and 1.98

The prior art relates to indicator devices and their use in computer numerical control machining. Known prior art connections for indicator devices are individual for the indicator and so lack quick connection capability to reduce time to change indicator devices speeding up the process of computer numerical control machining.

BRIEF SUMMARY OF THE INVENTION

An embodiment of the disclosure meets the needs presented above by generally comprising a body having a first face, a second face, and a peripheral wall extending between the first face and the second face. A primary hole extends through the body perpendicular to the first face and the second face. The primary hole is centrally positioned on the body. An offset hole extends through the body perpendicular to the first face and the second face. The offset hole has a diameter less than a diameter of the primary hole. The offset hole abuts the primary hole. A set screw aperture extends through the peripheral wall of the body and into the primary hole. A set screw is extendable through the set screw aperture for selectively securing an extension of an indicator in the primary hole or a connector of an indicator in the offset hole. Each of a plurality of flanges is coupled to and extends outwardly from the second face. The flanges are radially arranged around the primary hole. The flanges are configured for engaging the body to a collet of a computer numerical control machine.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
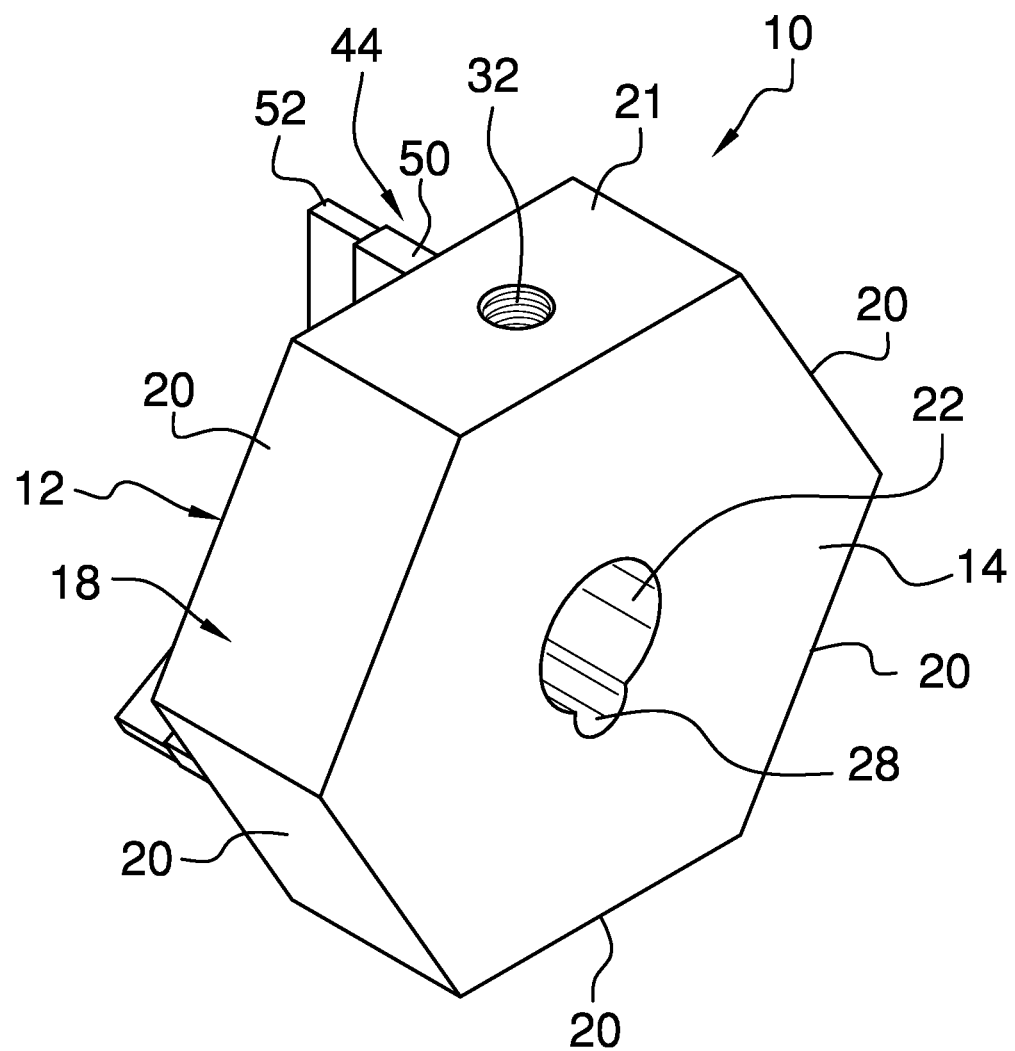
FIG. 1 is a top front side perspective view of an indicator connection adapter device according to an embodiment of the disclosure.
Figure 2:
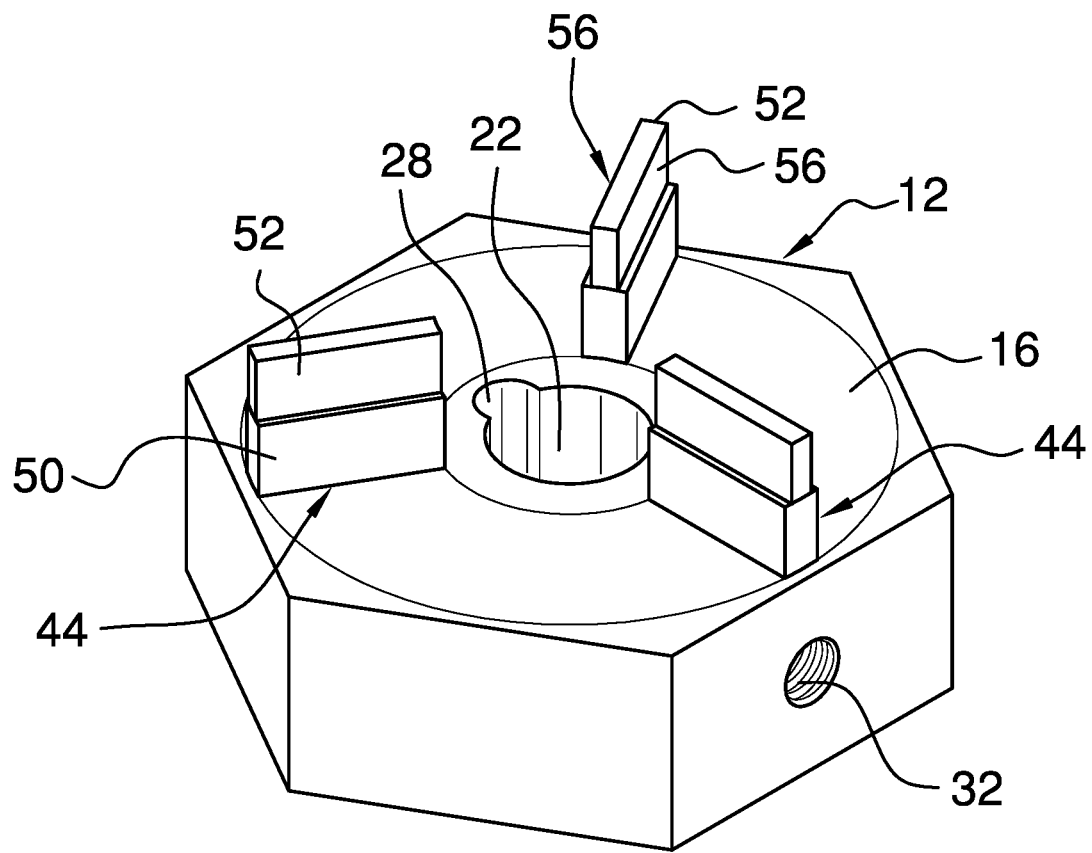
FIG. 2 is a top rear side perspective view of an embodiment of the disclosure.
Figure 3:
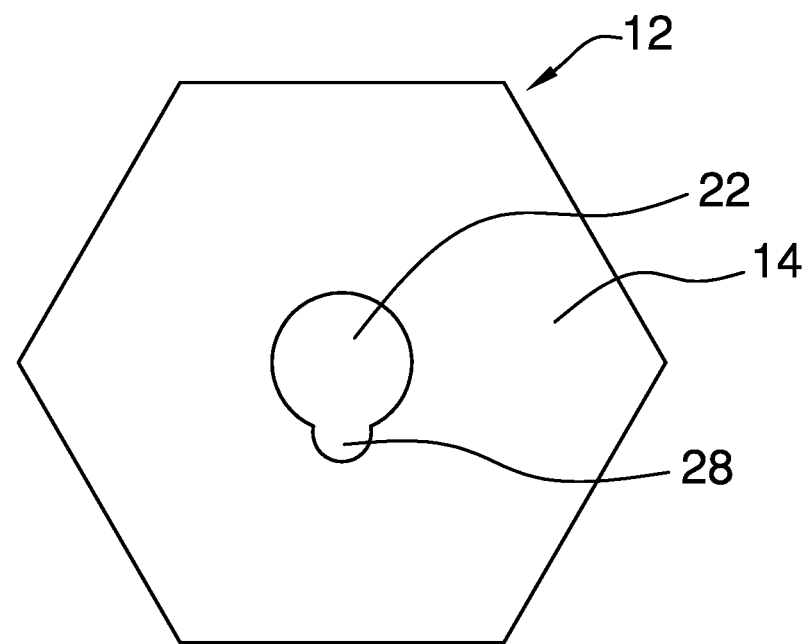
FIG. 3 is a front view of an embodiment of the disclosure.
Figure 4:
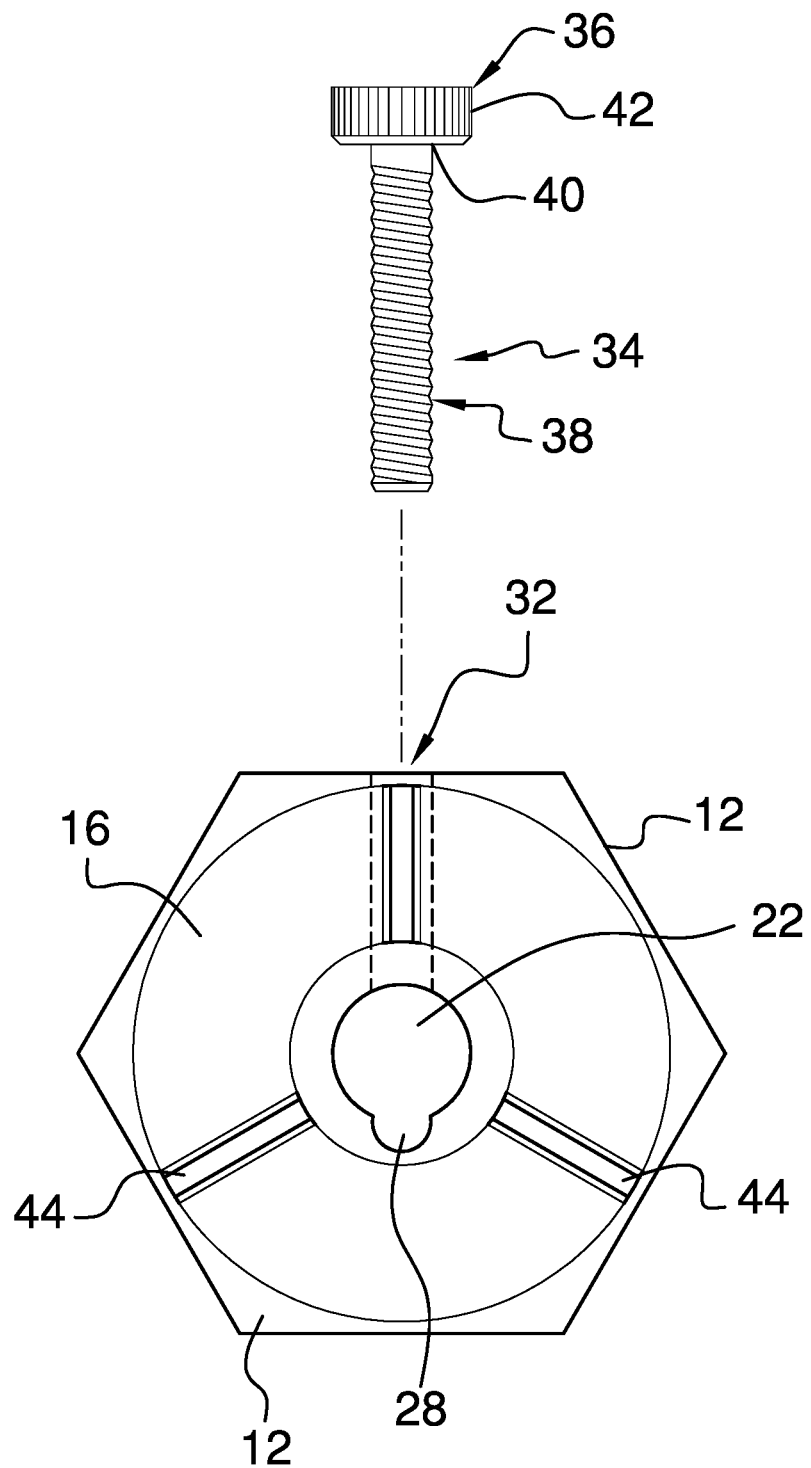
FIG. 4 is an exploded rear view of an embodiment of the disclosure.
Figure 5:
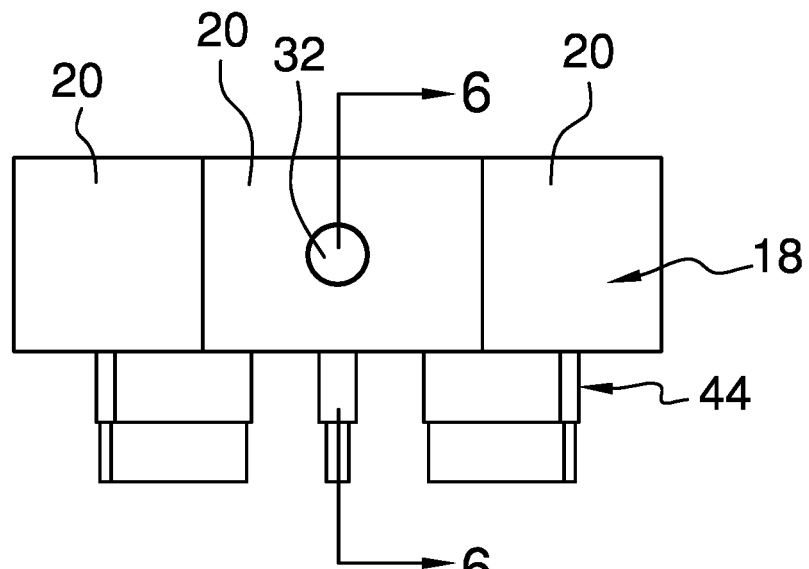
FIG. 5 is a top view of an embodiment of the disclosure.
Figure 6:
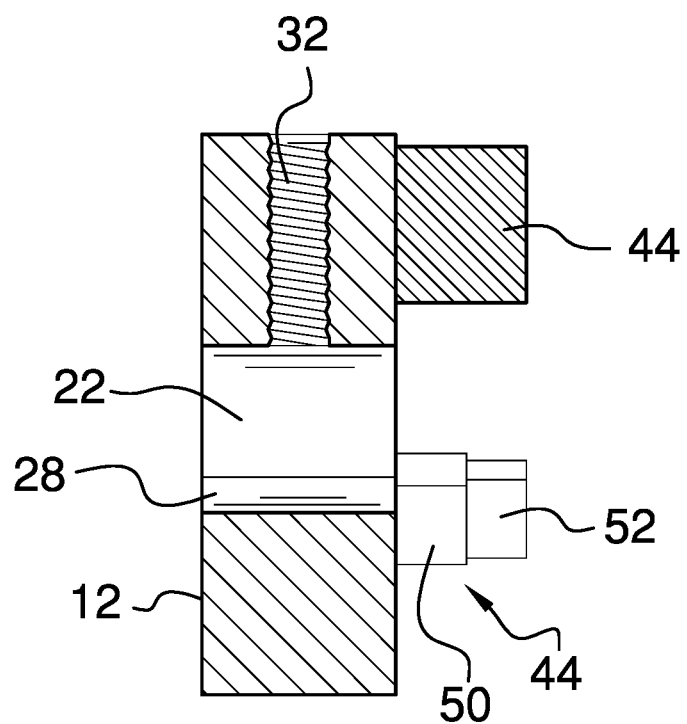
FIG. 6 is a cross-sectional view of an embodiment of the disclosure taken along line 6-6 of FIG. 5.
Figure 7:
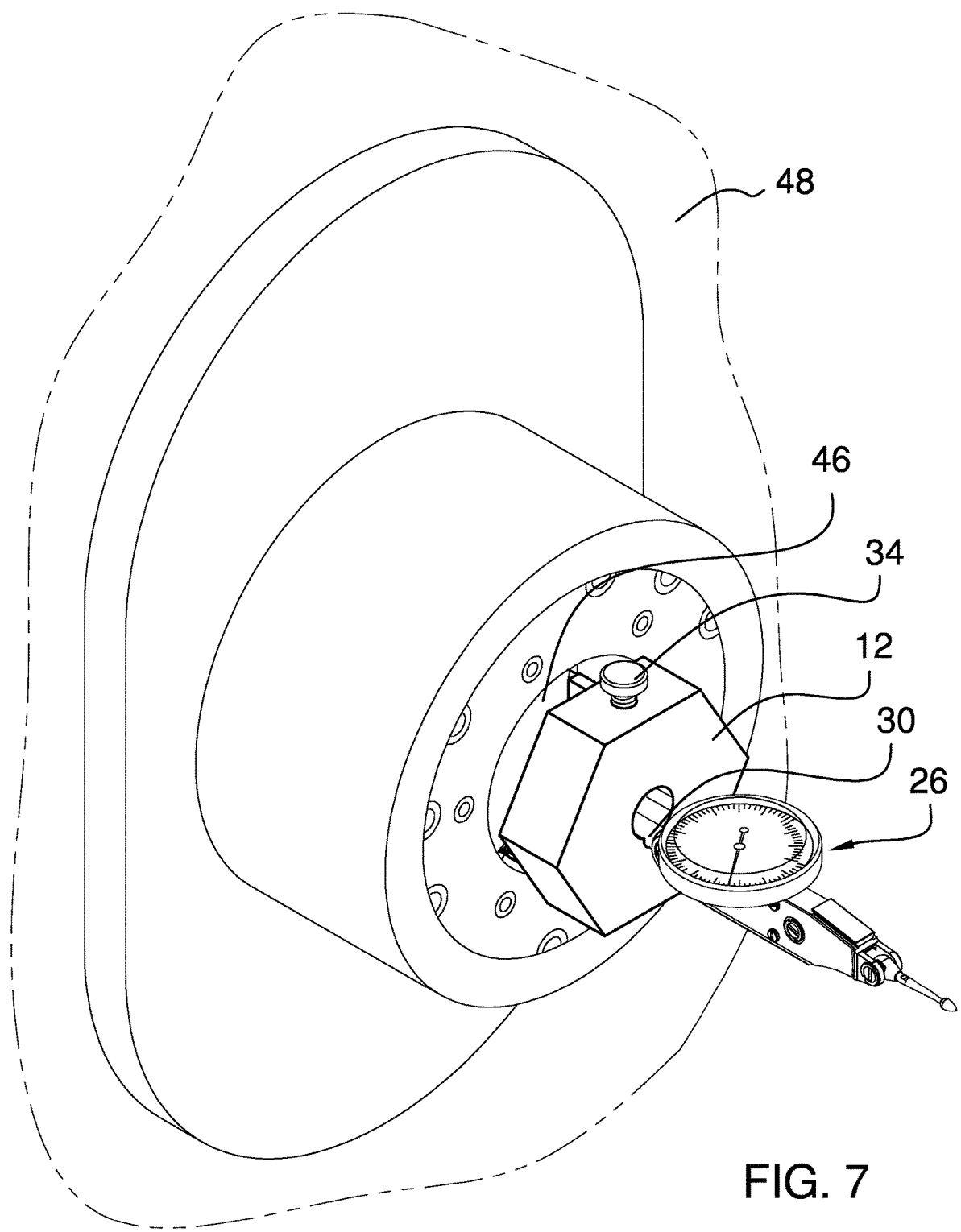
FIG. 7 is a top front side perspective view of an embodiment of the disclosure in use.
Figure 8:
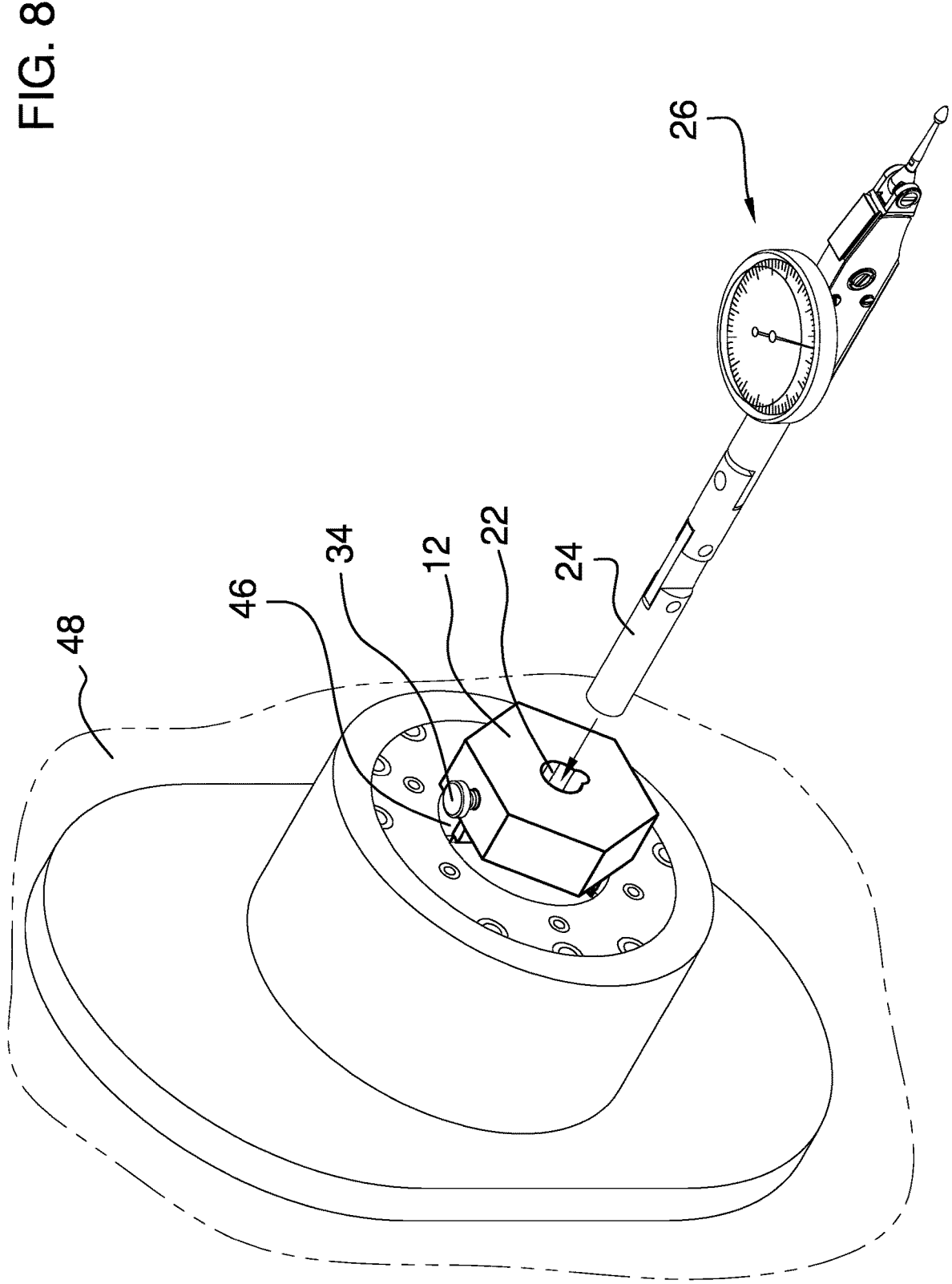
FIG. 8 is a partially exploded top front side perspective view of an embodiment of the disclosure in use.

With reference now to the drawings, and in particular to FIGS. 1 through 9 thereof, a new indicator connection adapter embodying the principles and concepts of an embodiment of the disclosure and generally designated by the reference numeral 10 will be described.

As best illustrated in FIGS. 1 through 9, the indicator connection adapter device 10 generally comprises a body 12. The body 12 has a first face 14, a second face 16, and a peripheral wall 18 extending between the first face 14 and the second face 16. The peripheral wall 18 of the body 12 has a plurality of planar facets 20. The planar facets 20 are of equivalent size and shape. The planar facets 20 may be arranged into parallel opposed pairs. A primary hole 22 extends through the body 12 perpendicular to the first face 14 and the second face 16. The primary hole 22 is centrally positioned on the body 12. A diameter of the primary hole is 0.375 inches for receiving a standard size of an extension 24 of an indicator 26. An offset hole 28 extends through the body 12 perpendicular to the first face 14 and the second face 16. The offset hole 28 has a diameter less than the diameter of the primary hole 22. Specifically, the diameter of the offset hole 28 is 0.157 inches to receive a standard connector 30 of the indicator 26. The offset hole 28 abuts the primary hole 22.

A set screw aperture 32 extends through the peripheral wall 18 of the body 12 and into the primary hole 22. The set screw aperture 32 extends outwardly from the primary hole 22 in a direction diametrically opposed to a position of the offset hole 28 along a circumference of the primary hole 22. The set screw aperture 32 may be tapped to be 8/32 inches. A set screw 34 complementary to the set screw aperture 32 is extendable 30 through the set screw aperture 32. Thus, the set screw 34 is configured for selectively securing the extension 24 of the indicator 26 in the primary hole 22 and the connector 30 of the indicator 26 in the offset hole 28. The set screw 34 has a head 36 and a shaft 38. The shaft 38 extends away from the head 36. A distal end 40 of the shaft 38 relative to the head 36 is planar and perpendicular to a longitudinal axis of the shaft 38. The shaft 38 of the set screw 34 is threaded. The head 36 is disc-shaped. A perimeter surface 42 of the head 36 is knurled.

Each of a plurality of flanges 44 is coupled to and extends outwardly from the second face 16. The flanges 44 are radially arranged around the primary hole 22. The flanges 44 are configured for engaging the body 12 to a collet 46 of a computer numerical control machine 48. There may be three flanges 44. Each of the flanges 44 has a base section 50 and a prong section 52 extending from the base section 50. The base section 50 has a length equal to a length of the prong section 52. The base section 52 has a width greater than a width of the prong section 52. The prong section 52 of each flange 44 has a pair of outer faces 56. The outer faces 56 are parallel to each other to facilitate insertion into and engagement of the prong section 52 of each flange 44 to the collet 46.

Figure 9:
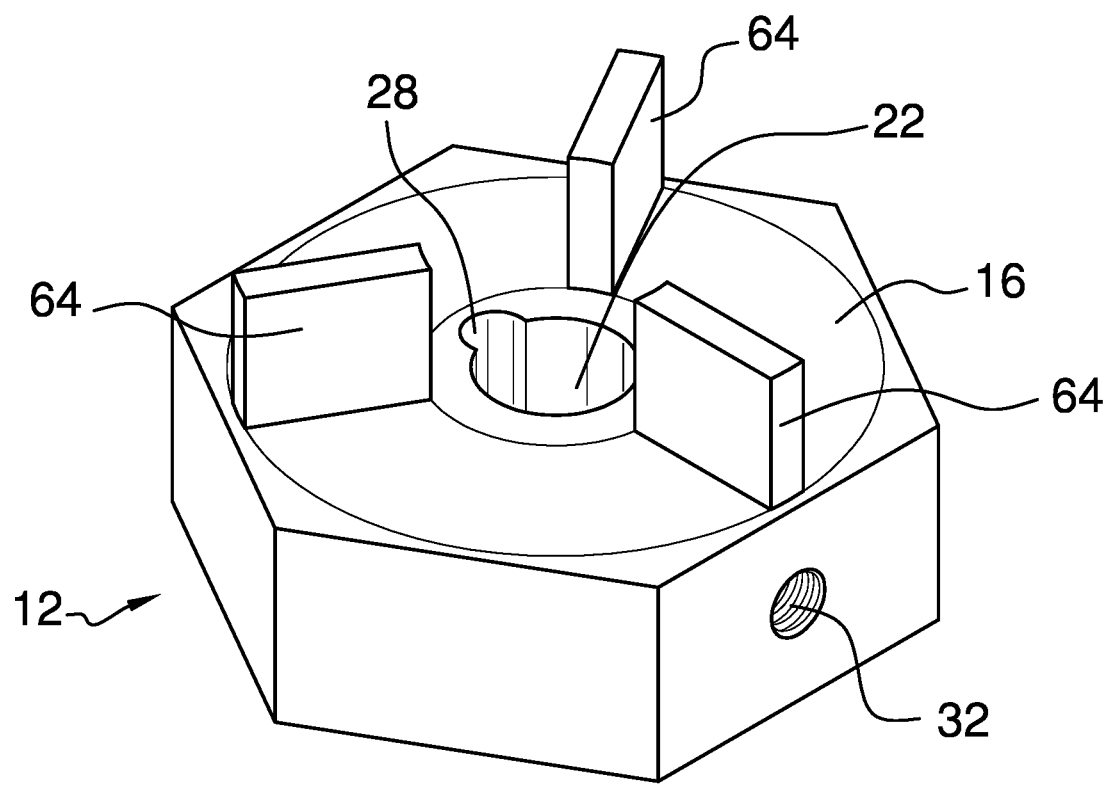
FIG. 9 is a top rear side perspective view of an embodiment of the disclosure.

In an alternative embodiment shown in FIG. 9, the structure is similar but for flanges 64 replace flanges 44. Flanges 64 have a constant thickness extending away from the body 12 such that there are no prong sections 52.

In use, the body 12 is engaged to the collet 46 by insertion of the prong section 52 of each flange 44 into the collet 46, or the flange 64 into the collet 46. Once the body 12 is engaged to the collet 46, the extension 24 or the connector 30 of the indicator 26 is inserted into the respective one of the primary hole 22 or the offset hole 28. The set screw 34 is inserted through the set screw aperture 32 until it engages the extension 24 or the connector 30 to secure the indicator 26 to the body 12. Removal and reconnection of the indicator 26 can be done loosening the set screw 34, exchanging the indicator 26 or repositioning the indicator 26, and then tightening the set screw 34.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An indicator connection adapter device comprising:
a body, said body having a first face, a second face, and a peripheral wall extending between said first face and said second face;
a primary hole extending through said body perpendicular to said first face and said second face, said primary hole being centrally positioned on said body;
an offset hole extending through said body perpendicular to said first face and said second face, said offset hole having a diameter less than a diameter of said primary hole, said offset hole abutting said primary hole;
a set screw aperture extending through said peripheral wall of said body and into said primary hole;
a set screw extendable through the set screw aperture wherein said set screw is configured for selectively securing an extension of an indicator in said primary hole and a connector of an indicator in said offset hole; and
a plurality of flanges coupled to and extending outwardly from said second face, said flanges being radially arranged around said primary hole, said flanges being configured for engaging said body to a collet of a computer numerical control machine.

2. The indicator connection adapter device of claim 1, further comprising the diameter of the primary hole being 0.375 inches.

3. The indicator connection adapter device of claim 1, further comprising the diameter of the offset hole being 0.157 inches.

4. The indicator connection adapter device of claim 1, further comprising said plurality of flanges being three flanges.

5. The indicator connection adapter device of claim 1, further comprising each of said flanges having a base section and a prong section extending from said base section, said base section having a length equal to a length of said prong section, said base section having a width greater than a width of said prong section.

6. The indicator connection adapter device of claim 5, further comprising said prong section of each flange having a pair of outer faces, said outer faces being parallel to each other.

7. The indicator connection adapter device of claim 1, further comprising said peripheral wall of said body comprising a plurality of planar facets, the planar facets being of equivalent size and shape.

8. The indicator connection adapter device of claim 1, further comprising said set screw comprising a head and a shaft, said shaft extending away from said head, a distal end of said shaft relative to said head being planar and perpendicular to a longitudinal axis of said shaft.

9. The indicator connection adapter device of claim 8, further comprising said shaft of said set screw being threaded.

10. The indicator connection adapter device of claim 8, further comprising said head being disc-shaped, a perimeter surface of said head being knurled.

11. The indicator connection adapter device of claim 1, further comprising said set screw aperture extending outwardly from said primary hole in a direction diametrically opposed to a position of said offset hole along a circumference of said primary hole.

12. An indicator connection adapter device comprising:
a body, said body having a first face, a second face, and a peripheral wall extending between said first face and said second face, said peripheral wall of said body comprising a plurality of planar facets, the planar facets being of equivalent size and shape;
a primary hole extending through said body perpendicular to said first face and said second face, said primary hole being centrally positioned on said body, a diameter of the primary hole being 0.375 inches;
an offset hole extending through said body perpendicular to said first face and said second face, said offset hole having a diameter less than the diameter of said primary hole, said offset hole abutting said primary hole, the diameter of the offset hole being 0.157 inches;
a set screw aperture extending through said peripheral wall of said body and into said primary hole, said set screw aperture extending outwardly from said primary hole in a direction diametrically opposed to a position of said offset hole along a circumference of said primary hole;
a set screw extendable through the set screw aperture wherein said set screw is configured for selectively securing an extension of an indicator in said primary hole and a connector of an indicator in said offset hole, said set screw comprising a head and a shaft, said shaft extending away from said head, a distal end of said shaft relative to said head being planar and perpendicular to a longitudinal axis of said shaft, said shaft of said set screw being threaded, said head being disc-shaped, a perimeter surface of said head being knurled; and a plurality of flanges coupled to and extending outwardly from said second face, said flanges being radially arranged around said primary hole, said flanges being configured for engaging said body to a collet of a computer numerical control machine, said plurality of flanges being three flanges, each of said flanges having a base section and a prong section extending from said base section, said base section having a length equal to a length of said prong section, said base section having a width greater than a width of said prong section, said prong section of each flange having a pair of outer faces, said outer faces being parallel to each other.

* * * * *